(12) United States Patent
Ginggen et al.

(10) Patent No.: US 7,805,112 B2
(45) Date of Patent: *Sep. 28, 2010

(54) POWER REGULATION FEEDBACK TO OPTIMIZE ROBUSTNESS OF WIRELESS TRANSMISSIONS

(75) Inventors: Alec Ginggen, Plymouth, MA (US); Rocco Crivelli, Bellinzona (CH)

(73) Assignee: Codman Neuro Sciences Sárl, Le Locle (CH)

(*) Notice: Subject to any disclaimer, the term of this patent is extended or adjusted under 35 U.S.C. 154(b) by 0 days.

This patent is subject to a terminal disclaimer.

(21) Appl. No.: 12/322,076

(22) Filed: Jan. 28, 2009

(65) Prior Publication Data

US 2009/0239478 A1  Sep. 24, 2009

Related U.S. Application Data

(63) Continuation of application No. 11/116,806, filed on Apr. 27, 2005, now Pat. No. 7,502,594.

(51) Int. Cl.
H04B 1/00 (2006.01)
H04B 7/00 (2006.01)

(52) U.S. Cl. .................. 455/69; 455/68; 455/522; 455/41.1; 455/41.2; 455/126; 455/127.1; 455/226.1; 455/226.2; 607/11; 607/60

(58) Field of Classification Search ....... 455/41.1–41.2, 455/522, 68–69, 126, 127.1–127.2, 226.1–226.3; 607/11, 60

See application file for complete search history.

(56) References Cited

U.S. PATENT DOCUMENTS

| | | | |
|---|---|---|---|
| 3,942,535 A | 3/1976 | Schulman | |
| 4,134,408 A | 1/1979 | Brownlee et al. | |
| 4,665,896 A | 5/1987 | La Forge et al. | |
| 4,924,171 A | 5/1990 | Baba et al. | |
| 5,325,046 A * | 6/1994 | Young et al. | 323/356 |
| 5,411,537 A | 5/1995 | Munshi et al. | |
| 5,476,488 A * | 12/1995 | Morgan et al. | 607/30 |
| 5,531,774 A | 7/1996 | Schulman et al. | |
| 5,630,836 A | 5/1997 | Prem et al. | |
| 5,702,431 A | 12/1997 | Wang et al. | |

(Continued)

FOREIGN PATENT DOCUMENTS

EP  0568398  11/1993

(Continued)

*Primary Examiner*—Tuan A Tran
(74) *Attorney, Agent, or Firm*—Cheryl F. Cohen, LLC

(57) ABSTRACT

A wireless communication system with power regulation feedback for improving the robustness of wireless communication transmissions between a receiver and an active emitter irrespective of the distance separation therebetween. The receiver receives wireless communications and detects a voltage induced therein. A feedback loop provides wireless transmission of power regulation feedback based on the detected voltage. The active emitter generates a power regulated data signal in which at least one of maximum and minimum bit voltage levels of respective logical high and low bits is adjusted based on the induced voltage received via the feedback loop. The RF power level, modulation index, and/or slew rate of a data signal emitted from the active emitter is regulated by adjusting at least one of maximum and minimum bit voltage levels of respective logical high and low bits based on voltage induced in the receiver during a previous communication from the active emitter.

13 Claims, 2 Drawing Sheets

U.S. PATENT DOCUMENTS

| | | | |
|---|---|---|---|
| 5,713,939 | A | 2/1998 | Nedungadi et al. |
| 5,733,313 | A | 3/1998 | Barreras, Sr. et al. |
| 5,735,887 | A | 4/1998 | Barreras, Sr. et al. |
| 5,755,748 | A | 5/1998 | Borza |
| 5,776,172 | A | 7/1998 | Schulman et al. |
| 5,905,372 | A | 5/1999 | Kuffner et al. |
| 5,938,691 | A | 8/1999 | Schulman et al. |
| 5,995,874 | A | 11/1999 | Borza |
| 6,058,330 | A | 5/2000 | Borza |
| 6,289,237 | B1 | 9/2001 | Mickle et al. |
| 6,430,444 | B1 | 8/2002 | Borza |
| 6,442,434 | B1 | 8/2002 | Zarinetchi et al. |
| 6,456,883 | B1 | 9/2002 | Torgerson et al. |
| 6,772,011 | B2 | 8/2004 | Dolgin |
| 6,993,393 | B2 * | 1/2006 | Von Arx et al. ............... 607/60 |
| 7,069,086 | B2 * | 6/2006 | Von Arx ..................... 607/60 |
| 7,151,378 | B2 | 12/2006 | Valenta, Jr. et al. |
| 7,151,914 | B2 | 12/2006 | Brewer |
| 7,502,594 | B2 * | 3/2009 | Ginggen et al. ............... 455/69 |
| 7,519,430 | B2 * | 4/2009 | Von Arx et al. ............... 607/60 |
| 7,539,541 | B2 * | 5/2009 | Quiles et al. .................. 607/31 |
| 7,668,596 | B2 * | 2/2010 | Von Arx et al. ............... 607/32 |
| 2004/0039423 | A1 | 2/2004 | Dolgin |

FOREIGN PATENT DOCUMENTS

| | | |
|---|---|---|
| GB | 2262628 | 6/1993 |
| WO | WO 00/16283 | 3/2000 |

\* cited by examiner

POWER REGULATION FEEDBACK TO OPTIMIZE ROBUSTNESS OF WIRELESS TRANSMISSIONS

CROSS-REFERENCE TO RELATED APPLICATIONS

This application is a continuation of prior application Ser. No. 11/116,806, filed Apr. 27, 2005, which is herein incorporated by reference in its entirety.

BACKGROUND OF THE INVENTION

1. Field of the Invention

The present invention is directed to a power regulation feedback system and method for optimizing the robustness of data transmissions across a wireless communication link irrespective of the separation distance between antennas of respective active emitter and receiver devices relative to one another.

2. Description of Related Art

In a variety of scientific, industrial, and medically related applications, it may be desirable to transfer information and data via a wireless communication link. Use of wireless communication is receiving particular wide spread development in medical applications. Drug infusion pumps, pacemakers, sensors, stimulators, defibrillators and cochlear implants are just a few, but not an exhaustive list, of medically implanted systems in the human body employing wireless communication. Typically, such medical application systems include an external control device having a primary winding, coil, or antenna in wireless communication with an implantable medical device having a secondary winding, coil, or antenna. Each electronic device may have its own power source. Alternatively, RF energy or power may be transferred from an external power source to power the implantable medical device. A portable external device is preferred in most medical application systems and thus, will not remain at a fixed or permanent location relative to the internal device. For example, an implantable drug infusion pump may be programmed or controlled by a portable external device positioned to rest proximate or in direct contact with the patient's body. Due to the portability of the external device, the distance separation between the primary and secondary coils will vary relative to one another.

Variation in separation distance of the coils has heretofore been recognized to impact the power supplied by the secondary winding to a load (e.g., an implanted device) source whereby the implantable device may potentially function erratically or intermittently as a result of the inconsistent or unstable source of available power. Specifically, U.S. Pat. No. 6,442,434 discloses a method and apparatus for providing a sufficiently stable power to a load in an implanted device in a transcutaneous energy transfer system (e.g., a TET system). A power supply and a primary winding are located on a first side external to a body while a secondary winding is disposed on a second side internal to the body. Power from a power source external to the body is transferred to the internal device which does not have its own power source. The power supplied by the secondary winding to a load (e.g., an implanted device) may be quite sensitive to more than nominal or trivial physical displacements of either the primary winding or the secondary winding from an optimum coupling position. In view of the fact that the primary and secondary windings of conventional TET devices are not necessarily fixed in position with respect to one another, the power supplied by the secondary winding to a load (e.g., an implanted device) may not be consistent and stable. Unstable power sources can result in undesirable intermittent or erratic power being supplied to the implantable medical device possibly interrupting operation with potentially life threatening consequences. This issue determines the suitability of the TET technology to a particular type of load, e.g., those implanted device requiring a consistent source of available power. Accordingly, it is an object of this patented TET system to provide a sufficiently stable power from the secondary winding to the load. Specifically, the system regulates the primary amplitude such that the load voltage across the load approaches and approximates a threshold voltage in the secondary circuit. The distance separation between the antennas or coils may have deleterious effects on the system other than providing an unstable power to the load which are neither recognized nor addressed by the patented system.

Regulating the TET system to provide a sufficiently stable passive power supply produced by the secondary winding to the load, as in the patented system, is of little, if any, concern when the implantable device is designed with its own internal power supply. Nevertheless, in a wireless communication system changes in the relative position (separation distance) of the windings, coils, or antennas relative to one another has other detrimental effects that have heretofore not been addressed. As the distance between the antennas increases and thus the amount of energy induced in the secondary coil decreases wireless communication between the devices becomes less robust thereby increasing transmission errors and loss.

It is therefore desirable to develop an improved energy transfer system in which irrespective of the separation distance between the primary and secondary antennas or coils, robust wireless communication of digital data transmissions is optimized.

SUMMARY OF THE INVENTION

The present invention is directed to an energy transfer system that includes power regulation feedback to optimize wireless digital data transmission irrespective of the relative positioning of the primary and secondary windings or coils.

In particular, the present invention relates to a wireless communication system with power regulation feedback to improve robustness of wireless communication transmissions between a receiver and active emitter irrespective of distance separation therebetween. The receiver is adapted to receive wireless communications and detect a voltage induced therein. A feedback loop provides for wireless transmission of power regulation feedback based on the voltage induced in the receiver. The active emitter generates a power regulated data signal in which at least one of maximum and minimum bit voltage levels of respective logical high and low bits is adjusted based on the induced voltage received via the feedback loop.

Another embodiment of the invention is directed to a wireless communication system with power regulation feedback to improve robustness of wireless communication transmissions between a receiver and active emitter irrespective of distance separation therebetween. The receiver is adapted to receive an RF modulated data signal. In addition, the receiver includes a converter for collecting RF energy from the received RF modulated data signal and converting the RF energy to an induced voltage signal; a first demodulator for demodulating the received RF modulated data signal; a first processor for receiving as input the demodulated RF data signal and the induced voltage signal and generating an RF responsive data signal including the induced voltage signal;

and a first modulator for receiving as input the RF responsive data signal and generating an RF modulated responsive data signal. The active emitter is in wireless communication with the receiver for receiving the RF modulated responsive data signal. The active emitter includes a second demodulator for demodulating the received RF modulated responsive data signal; a second processor for receiving as input the demodulated RF responsive data signal, the second processor generating new data and at least one of adjusted maximum and minimum bit voltage levels of respective logical high and low bits based on the induced voltage signal of the demodulated RF responsive data signal; a data converter for receiving as input the new data and the at least one adjusted maximum and minimum bit voltage levels from the second processor, the data converter producing as output a converted data signal at an adjusted voltage level based on an average of the adjusted maximum and minimum bit voltage levels; an RF carrier generator for generating an RF carrier wave; and a second modulator for receiving as input the converted data signal and the carrier wave, the modulator generating as output a new RF modulated data signal to be transmitted to the receiver.

Furthermore, the present invention discloses a method for using a wireless communication system with power regulation feedback to improve robustness of wireless communication transmissions between a receiver and active emitter irrespective of distance separation therebetween, as described in the previous paragraphs. At least one of RF power level, modulation index, and slew rate of a data signal emitted from the active emitter is regulated by adjusting at least one of maximum and minimum bit voltage levels of respective logical high and low bits based on voltage induced in the receiver during a previous wireless communication from the active emitter.

Still another embodiment is directed to a method for using a wireless communication system with power regulation feedback to improve robustness of wireless communication transmissions between a receiver and active emitter irrespective of distance separation therebetween. Energy is sampled in the receiver, transmitted wirelessly to the active emitter, and the emitted power generated by the active emitter is regulated based on the wireless transmitted sampled energy from the receiver.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 2b is an exemplary voltage versus time graphical representation on the external device side of the converted data signal output of the data signal converter whose input is the data stream shown in FIG. 2a.

DETAILED DESCRIPTION OF THE INVENTION

Figure 1:
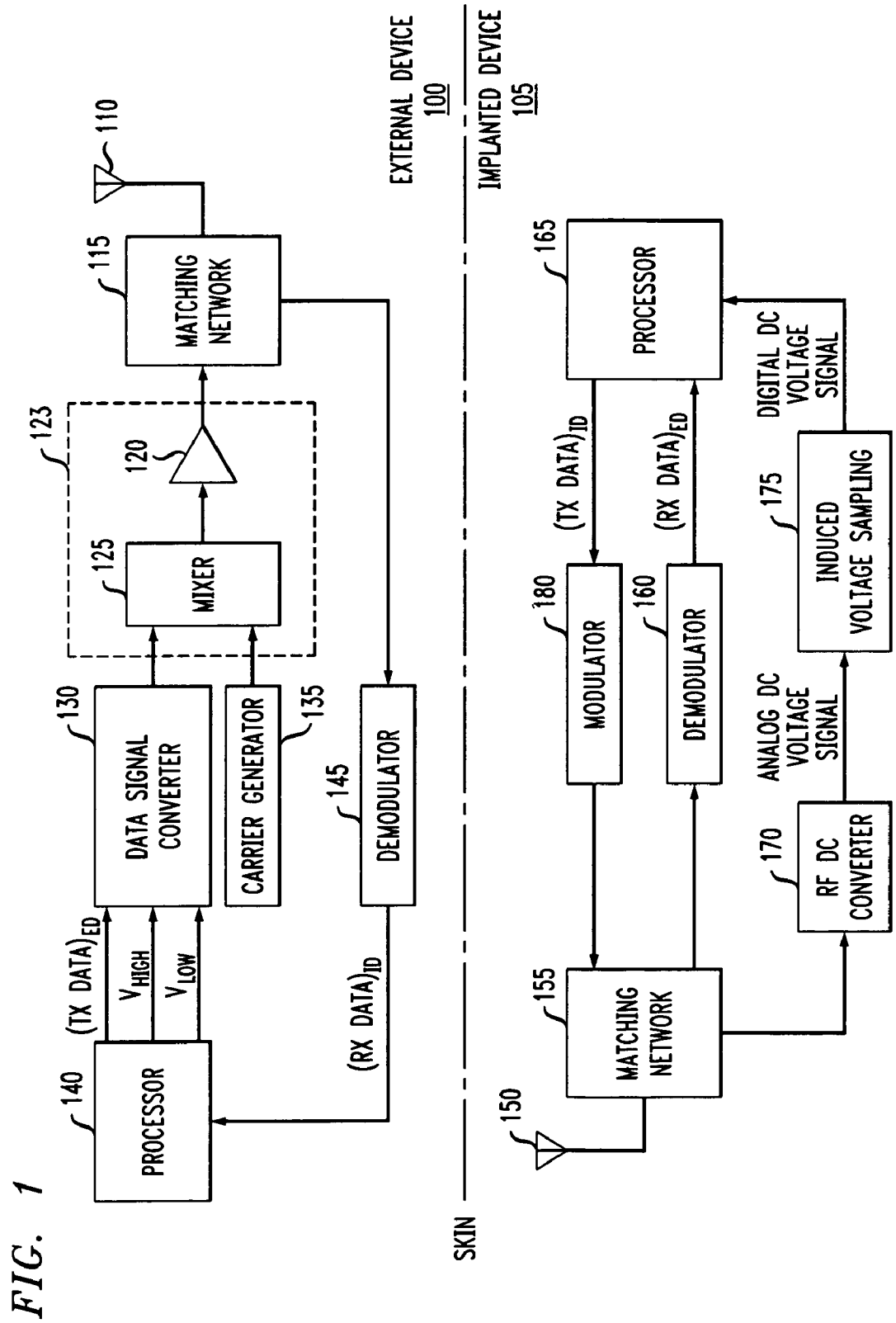
FIG. 1 is a schematic diagram of an exemplary TET system in accordance with the present invention including power regulation feedback for optimizing wireless digital data transmission.

The present invention is directed to a system in which wireless communication occurs between an active emitter and a receiver. By way of example, a TET system and method in accordance with the present invention is shown in FIG. 1 for an internal device (e.g., an implantable drug infusion pump) 105 in wireless communication with an external device 100, e.g., a control unit or PC. It is to be understood, however, that the present invention may be used for other implantable medical devices or other electronic devices not related to the medical field. Instead, the present invention is suitable for any system comprising an active emitter that communicates wirelessly with a receiver. In a preferred embodiment, each electronic device has its own power source (e.g., battery), not shown.

External device 100 is portable so as to be positioned proximate or in direct contact with the patient's body during communication with the implantable medical device 105. Due to the portability of the external device, the distance separation between primary and secondary antennas, windings, or coils 110, 150, respectively, relative to one another may vary. As the separation distance between the two antennas increases, the robustness of digital data transmission during wireless communication deteriorates and thus becomes more susceptible to transmission loss and errors. The present inventive power regulation feedback design optimizes digital data transmission irrespective of the relative positioning or distance separation of the primary and secondary windings relative to one another.

It has been recognized that the robustness of digital data transmission via wireless communication depends on one or more of the following factors: (i) the amplitude of power emitted by the external device 100; (ii) the modulation index of the data signal, i.e., the amount of amplitude modulation on the carrier wave or signal; and (iii) slew rate, i.e., slope of the data signal in the transition regions. The present invention improves digital data transmission irrespective of the distance separation between the primary and secondary windings relative to one another by regulating via a power feedback loop one or more parameters, namely, the power emitted by the active emitter (e.g., external device), the modulation index of the data signal emitted by the active emitter, and/or its slew rate. The power regulation feedback loop allows a substantially constant level of induced power to be maintained in the implantable medical device 105 irrespective of the distance separation of the primary and secondary coils 110, 150, respectively, relative to one another.

External device 100 includes a processor or controller 140 that generates a data packet signal (TX DATA)$_{ED}$ to be transmitted to the implantable medical device 105. For clarification, the subscript "ED" will be used to denote data transmitted by (TX DATA)$_{ED}$ or data received from (RX DATA)$_{ED}$ the external device 100, whereas the subscript "ID" will represent responsive data transmitted by (TX DATA)$_{ID}$ or data received from (RX DATA)$_{ID}$ the internal device 105. A data signal converter 130 receives the transmission data signal (TX DATA)$_{ED}$ and two new or adjusted voltage level signals, e.g., an adjusted maximum (high) voltage level signal ($V_{MAX}$) and an adjusted minimum (low) voltage level signal ($V_{MIN}$). These two adjusted voltage levels represent the maximum (high) and minimum (low) voltage levels representative of respective logical high an low bits (e.g., "1"s and "0"s bits), respectively, based on the detected induced voltage in the implantable medical device 105 during the last communication from the external device 100, as explained in further detail below. Data signal converter 130 outputs a converted data signal having the same shape as the data packet signal (TX DATA)$_{ED}$ at a converted voltage level ($V_{AVG}$) based on an average of the new or adjusted input values of $V_{MAX}$ and $V_{MIN}$ received from the processor 140. By increasing the average voltage level ($V_{AVG}$) more RF power or energy is provided to the implantable medical device 105. A modulator 123 amplitude modulates the RF carrier wave by the data signal to produce an RF modulated data signal. In the embodiment shown in FIG. 1, the modulator 123 comprises a mixer 125 that receives as input the converted signal and a carrier signal or wave from generator 135 to produce an RF modulated data signal. In a preferred embodiment the carrier signal or wave has a frequency of approximately 13.56 MHz. The output of mixer 125 is fed as input to a constant gain amplifier 120 and produces as output an RF amplitude modulated data signal. As an alternative embodiment, the arrangement of the mixer 125 and amplifier 120 may be switched. The RF amplitude modulated data signal is passed through a matching network 115 prior to being wirelessly transmitted via the primary antenna, winding, or coil 110 to the implantable medical device 105.

At the implantable medical device 105, the RF amplitude modulated data signal received by the secondary antenna, winding, or coil 150 of the implantable medical device 105 is transmitted to a matching network 155. At the output of the matching network 155, the RF amplitude modulated data signal is demodulated by block 160 to extract the received data signal (RX DATA)$_{ED}$ and converted into a data stream represented by logic levels able to be interpreted by the processor 165. In turn, the received data signal output from the demodulator 160 is received as input to processor or controller 165. The data signal (TX DATA)$_{ED}$ generated and transmitted by the external device 100 is similar in shape to the received data signal (RX DATA)$_{ED}$ input to the processor 165 in the implantable medical device 105.

A second output of the matching network 155 is electrically connected to an RF/DC converter 170 which collects RF energy from the received RF amplitude modulated signal and converts it to an analog DC induced voltage signal. This induced power in the secondary coil 150 is sampled in block 175 to produce a digital DC induced voltage signal which is proportional to the induced power received in the implantable medical device 105. The DC induced voltage signal is preferably digital rather than analog so as to provide stable hardware that may be readily upgraded without changing the hardware itself and therefore is less expensive to manufacture and maintain. In a preferred embodiment the power induced in the secondary coil 150 is sampled approximately once every tenth of a second. However, the sampling rate may be modified, as desired. Processor or controller 165 receives as a second input the digital DC induced voltage signal. In reply to a communication signal from the external device 100, processor 165 in the implantable medical device 105 generates a responsive data signal (TX DATA)$_{ID}$ for transmission that includes the digital DC induced voltage signal as well as a responsive data stream signal. The responsive data signal (TX DATA)$_{ID}$ is received by modulator 180 which outputs the RF modulated responsive data signal that is processed by the matching network 155 prior to being transmitted via the secondary antenna or coil 150 to the external device 100.

On the external device side, the RF modulated responsive data signal (TX DATA)$_{ID}$ transmitted by the implantable medical device 105 is received by the primary coil 110 and matching network 115. Demodulator 145 receives as input the RF modulated responsive signal output from the matching network 115 and converts it into a demodulated RF responsive data signal (RX DATA)$_{ID}$ represented by logic levels able to be interpreted by processor 140. Demodulated RF responsive data signal (RX DATA)$_{ID}$ includes the induced voltage signal representative of the amount of induced power received in the implantable medical device 105 during the last communication from the external device 100. The shape of the data signal (RX DATA)$_{ID}$ is similar in shape to that of the data signal (TX DATA)$_{ID}$. Processor 140 receives as input the responsive data signal (RX DATA)$_{ID}$ output of demodulator 145 including the digital DC induced voltage signal representative of the amount of induced power received in the implantable medical device during the last communication from the external device.

At the time of the next communication by the external device 100 to the implantable medical device 105, processor 140 in addition to generating a new data signal (TX DATA)$_{ED}$ optimizes power transmission by varying at least one of the power emitted by the external device, the modulation index and/or the slew rate. As previously mentioned, the responsive data signal generated by the implantable medical device includes the DC digital induced voltage signal received by the implantable medical device during the last communication from the external device. Based on the feedback DC digital induced voltage signal processor 140 derives new or adjusted $V_{MAX}$ and $V_{MIN}$ signals to optimize digital data transmission. In a preferred embodiment, processor 140 correlates the received feedback DC digital induced voltage signal with new or adjusted empirically determined $V_{MAX}$ and $V_{MIN}$ values retrieved from a look-up-table (LUT). The modulation index is calculated based on the equation $m=(V_{MAX}-V_{MIN})/(V_{MAX}+V_{MIN})$. Thus, changes in $V_{MAX}$ and/or $V_{MIN}$ may vary the modulation index between 0 and 1. On the one hand, the higher the modulation index (i.e., the closer the modulation index approaches 1) the more robust (larger maximum to minimum bit transitions) data transmission, at the expense of a decrease in average emitted power and an increase in emitted harmonics (the acceptable levels of which are set by international radio standards). In addition, the amount of energy emitted by the external device 100 and thus induced in the implantable medical device 105 is proportional to $V_{AVG}$. Accordingly, the maximum and minimum voltage levels, $V_{MAX}$ and $V_{MIN}$, respectively, are received and averaged by the data signal converter 130. The maximum and minimum bit voltage levels ($V_{MAX}$ and $V_{MIN}$) and thus modulation index may be varied independently of changes in the amount of energy emitted by the external device which is representative of $V_{AVG}$. Various permutations may be realized based on the new or adjusted $V_{MAX}$ and $V_{MIN}$ values generated by the processor 140. A few illustrative examples are provided in the Table below.

TABLE

|  | Previous Voltage Levels & modulation index (m) | Adjusted Voltage Levels | Modulation Index & Power Emitted |
|---|---|---|---|
| Scenario I | $V_{MAX} = 4$<br>$V_{MIN} = 2$<br>$V_{AVG} = 3$<br>$m = 0.33$ | $V_{MAX} = 5$<br>$V_{MIN} = 3$<br>$V_{AVG} = 4$<br>$m = 0.25$ | Decrease in modulation index; emitted power increased |
| Scenario II | $V_{MAX} = 5$<br>$V_{MIN} = 3$<br>$V_{AVG} = 4$<br>$m = 0.25$ | $V_{MAX} = 3$<br>$V_{MIN} = 1$<br>$V_{AVG} = 2$<br>$m = 0.5$ | Increase in modulation index; emitted power decreased |
| Scenario III | $V_{MAX} = 5$<br>$V_{MIN} = 3$<br>$V_{AVG} = 4$<br>$m = 0.25$ | $V_{MAX} = 6$<br>$V_{MAX} = 2$<br>$V_{AVG} = 4$<br>$m = 0.5$ | Increase in modulation index; no change in emitted power |

In the first scenario the variations in $V_{MAX}$, $V_{MIN}$ result in a decrease in the modulation index while the power emitted (which is proportional to $V_{AVG}$) by the external device increases. Just the opposite occurs in the second scenario in which the variation in $V_{MAX}$ and $V_{MIN}$ results in an increase in the modulation index and a decrease in power emitted by the external device. The last scenario represents an illustrative example to demonstrate that the modulation index may be varied without eliciting any change in $V_{AVG}$ and thus no effect on the amount of power emitted by the external device or induced in the implantable medical device.

To summarize, if the DC induced voltage in the implantable medical device during the last communication is too low, then $V_{MAX}$ and/or $V_{MIN}$ are adjusted to increase $V_{AVG}$ thereby inducing more power in the implantable medical device while transmitting the same data stream. On the other hand, $V_{MAX}$ and/or $V_{MIN}$ may be adjusted to decrease $V_{AVG}$ if the power induced in the implantable medical device is too high. Accordingly, it is possible via feedback power regulation to adjust $V_{MAX}$, $V_{MIN}$ thereby regulating $V_{AVG}$ so as to sustain a substantially constant power induced in the implantable medical device. Under certain circumstances, it may be desirable to vary $V_{MAX}$, $V_{MIN}$ (thereby altering the modulation index) while $V_{AVG}$ remains unchanged thereby maintaining the same power emitted by the external device while optimizing the robustness (bit transitions) during transmission.

Figure 2A:
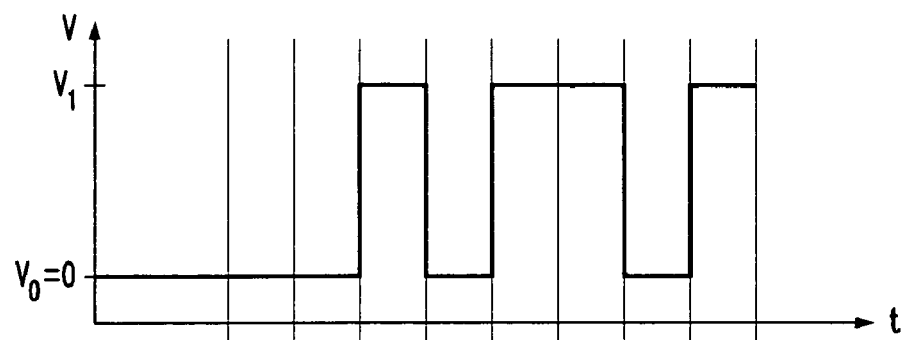
FIG. 2a is an exemplary voltage versus time graphical representation of a transmission data stream generated by the processor on the external device side.
Figure 2B:
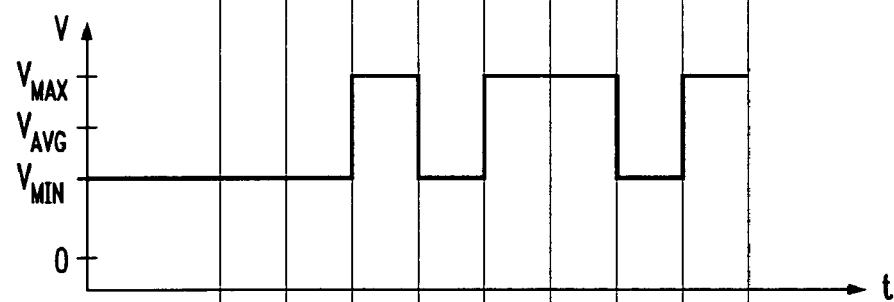
Figure 2C:
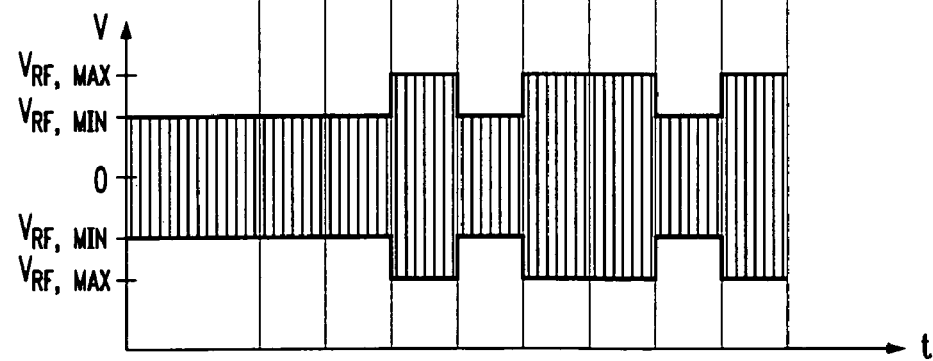
FIG. 2c is an exemplary voltage versus time graphical representation on the external device side of the RF amplitude modulated signal.

FIGS. 2a, 2b, 2c represent exemplary voltage versus time graphical signals on the external device side 100, wherein the power level, modulation index, and slew rate are held constant. Specifically, FIG. 2a shows an exemplary transmission data signal (TX DATA)$_{ED}$ generated by the processor 140 in the external device 100. The exemplary transmission data signal represents a stream of maximum voltage ($V_1$) and minimum voltage ($V_0$=0) levels representative of logical high and low bits (e.g., "1"s and "0" bits), respectively. In the illustrative example the data stream being represented is "0,0,0,1,0,1,1,0,1". Based on this exemplary transmission data signal the output of the data signal converter 130 would be a converted signal, an illustrative example of which is shown in FIG. 2b, having an average voltage $V_{AVG}=(V_{MAX}+V_{MIN})/2$. As is readily apparent the signals shown in FIGS. 2a and 2b are similar in shape however, there has been a shift, adjustment or conversion in the voltage level. Specifically, adjusted maximum ($V_{MAX}$) and minimum ($V_{MIN}$) voltage levels representative of respective logical high and low bits (e.g., "1"s and "0"s), respectively, are derived by processor 140 based on the feedback induced voltage in the implantable medical device detected during the last communication from the external device. The minimum voltage value of the data stream in FIG. 2a previously equal to zero has been adjusted upwards to a new voltage value $V_{MIN}$>0, in FIG. 2b. A graphical representation of an exemplary RF amplitude modulated signal output from the amplifier 120 of the external device is shown in FIG. 2c. The RF amplitude modulated signal is now centered about "0". In FIG. 2c, the RF modulated signal voltage values $V_{RF,MAX}$ and $V_{RF,MIN}$ are proportional to $V_{MAX}$ and $V_{MIN}$, respectively, in FIG. 2b as a result of employing an amplifier 120 of constant gain. The graphical representation of the RF modulated signal output of the amplifier 120 in the external device 100 is the same in shape for the signal received on the implantable medical device side at both the input and output of the matching network 155.

Therefore, the robustness of the digital data transmission is optimized by adjusting $V_{MAX}$ and/or $V_{MIN}$ based on the detected induced power in the secondary winding 120 of the implantable medical device so as to alter the power level, modulation index and/or slew rate of a signal emitted by an active emitter. As a result of the improved robustness in transmission the susceptibility of the wireless communication link to transmission errors is minimized.

In the exemplary embodiment shown in FIG. 1, the power regulation feedback in accordance with the present invention is only employed to improve data transmission from the external device to the internal device. The reason being is that in the exemplary embodiment shown in FIG. 1 only the external device 100 has an active emission, mechanism (i.e., a device that employs an active emitter so as to modulate the carrier wave by the data signal), whereas the internal device 105 has a passive emission mechanism (i.e., it does not employ an active emitter, instead varying the amplitude of the wave emitted by the control unit). The need for power regulation feedback of the emitted RF power in accordance with the present invention is applicable only to improve the robustness of data transmission from a device employing an active emitter (e.g., the external device 100) to a receiver (e.g., the internal device 105). It is, however, contemplated and within the intended scope of the invention for the power regulation feedback circuitry to be applied for transmissions from the internal device to the external device when the internal device employs an active emitter mechanism that emits RF energy. Alternatively, power regulation feedback may be employed bi-directionally during wireless communication between a external device and an internal device, wherein both devices employ an active emitter mechanism.

Furthermore, the data signal emitted from the active emitter (external device) 100 in FIG. 1 is described in the preferred embodiment has being amplitude modulated. It is, however, contemplated that other forms of modulation (e.g., frequency or phase shift modulation) may be employed. Depending on the type of modulation used, the parameters regulated to improve robustness of data transmission differ. For example, regulation of the modulation index and slew rate is particular to amplitude modulation. Thus, depending on the type of modulation scheme employed, the present invention contemplates the regulation via a wireless transmission power feedback loop of any one or more of the following parameters: RF power level, modulation index, and slew rate of the data signal emitted by the active emitter.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A wireless communication system with power regulation feedback to improve robustness of wireless communication transmissions between a receiver and active emitter irrespective of distance separation therebetween, comprising:

the receiver being adapted to receive wireless communications and detect a voltage signal induced therein;

a feedback loop for wireless transmission of power regulation feedback based on an RF responsive data signal including the induced voltage signal detected in the receiver; and the active emitter being adapted for generating a power regulated data signal in which at least one of maximum and minimum bit voltage levels of respective logical high and low bits is adjusted based on the RF responsive data signal including the induced voltage signal received via the feedback loop.

2. The wireless communication system in accordance with claim 1, wherein the active emitter further comprises a processor for adjusting the at least one of maximum and minimum bit voltage levels of respective logical high and low bits in order to regulate at least one of RF power level, modulation index, and slew rate of the data signal emitted by the active emitter based on the induced voltage received via the feedback loop.

3. The wireless communication system in accordance with claim 1, wherein in the active emitter the at least one bit voltage level is adjusted based on the induced voltage signal of the demodulated RF responsive data signal in order to vary at least two parameters selected from the group consisting of RF power level, modulation index and slew rate of the of the data signal emitted by the active emitter.

4. The wireless communication system in accordance with claim 1, wherein in the active emitter the at least one bit voltage level is adjusted based on the induced voltage signal of the demodulated RF responsive data signal in order to vary RF power level, modulation index, and slew rate of the of the data signal emitted by the active emitter.

5. A method for using a wireless communication system with power regulation feedback to improve robustness of wireless communication transmissions between a receiver and active emitter irrespective of distance separation therebetween, comprising the steps of:

receiving an RF modulated data signal at the receiver:
converting RF energy from the received RF modulated data signal to an induced voltage signal;
demodulating the received RF modulated data signal;
generating an RF responsive data signal including the induced voltage signal using a first processor receiving as input the demodulated RF data signal and the induced voltage signal;
modulating the RF responsive data signal and producing an RF modulated responsive data signal;
transmitting wirelessly the RF modulated responsive data signal from the receiver to the active emitter;
demodulating the received RF modulated responsive data signal to produce a demodulated RF responsive data signal;
generating new data and at least one of adjusted maximum and minimum bit voltage levels of respective logical high and low bits in response to receiving as input to a second processor the demodulated RF responsive data signal; the bit voltage levels being adjusted based on the induced voltage signal of the demodulated RF responsive data signal; and
shifting the new data to an adjusted voltage level based on the average of the at least one adjusted maximum and minimum bit voltage levels to produce a converted data signal.

6. The method in accordance with claim 5, further comprising the steps of:

generating a carrier wave; and
modulating the carrier wave by the converted data signal to produced a new RF modulated data signal.

7. The method in accordance with claim 6, further comprising transmitting the new RF modulated data signal from the active emitter to the receiver.

8. The method in accordance with claim 5, wherein the shifting step comprises adjusting the at least one maximum and minimum bit voltage levels based on the induced voltage signal of the demodulated RF responsive data signal in order to vary at least one parameter selected from the group consisting of RF power level, modulation index and slew rate of the of the data signal emitted by the active emitter.

9. The method in accordance with claim 8, wherein the shifting step comprises adjusting the at least one maximum and minimum bit voltage levels based on the induced voltage signal of the demodulated RF responsive data signal in order to vary at least two parameters selected from the group consisting of RF power level, modulation index and slew rate of the of the data signal emitted by the active emitter.

10. The method in accordance with claim 8, wherein the shifting step comprises adjusting the at least one maximum and minimum bit voltage levels based on the induced voltage signal of the demodulated RF responsive data signal in order to vary RF power level, modulation index, and slew rate of the of the data signal emitted by the active emitter.

11. A method for using a wireless communication system with power regulation feedback to improve robustness of wireless communication transmissions between a receiver and active emitter irrespective of distance separation therebetween, comprising the steps of:

regulating based on an RF responsive data signal including a detected voltage signal induced in the receiver, at least one of RF power level, modulation index, and slew rate of a data signal emitted from the active emitter by adjusting at least one of maximum and minimum bit voltage levels of respective logical high and low bits based on the detected voltage signal induced in the receiver during a previous wireless communication from the active emitter.

12. The method in accordance with claim 11, wherein the regulating step further comprises adjusting the at least one maximum and minimum bit voltage levels based on the induced voltage signal induced in the receiver during a previous communication from the active emitter in order to vary at least two parameters selected from the group consisting of RF power level, modulation index, and slew rate of the of the data signal emitted by the active emitter.

13. The method in accordance with claim 11, wherein the regulating step further comprises adjusting the at least one maximum and minimum bit voltage levels based on the induced voltage signal induced in the receiver during a previous communication from the active emitter in order to vary RF power level, modulation index and slew rate of the of the data signal emitted by the active emitter.

* * * * *